July 12, 1938.   D. M. PEILL ET AL   2,123,435
LAMP FOR ROAD VEHICLES
Filed Feb. 6, 1937   4 Sheets-Sheet 1
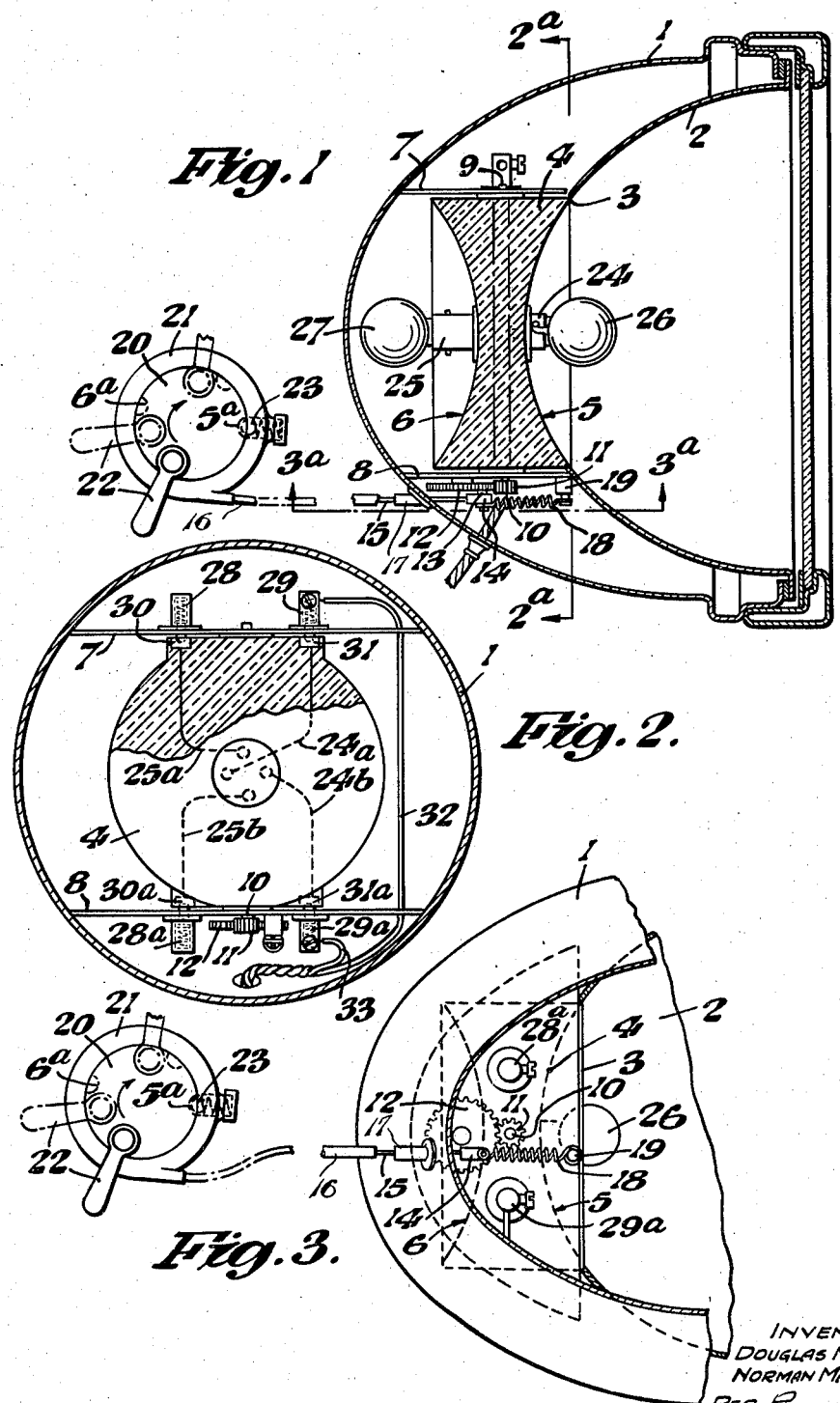
INVENTORS
DOUGLAS M PEILL
NORMAN MACINTYRE
PER Rayner
ATTORNEYS

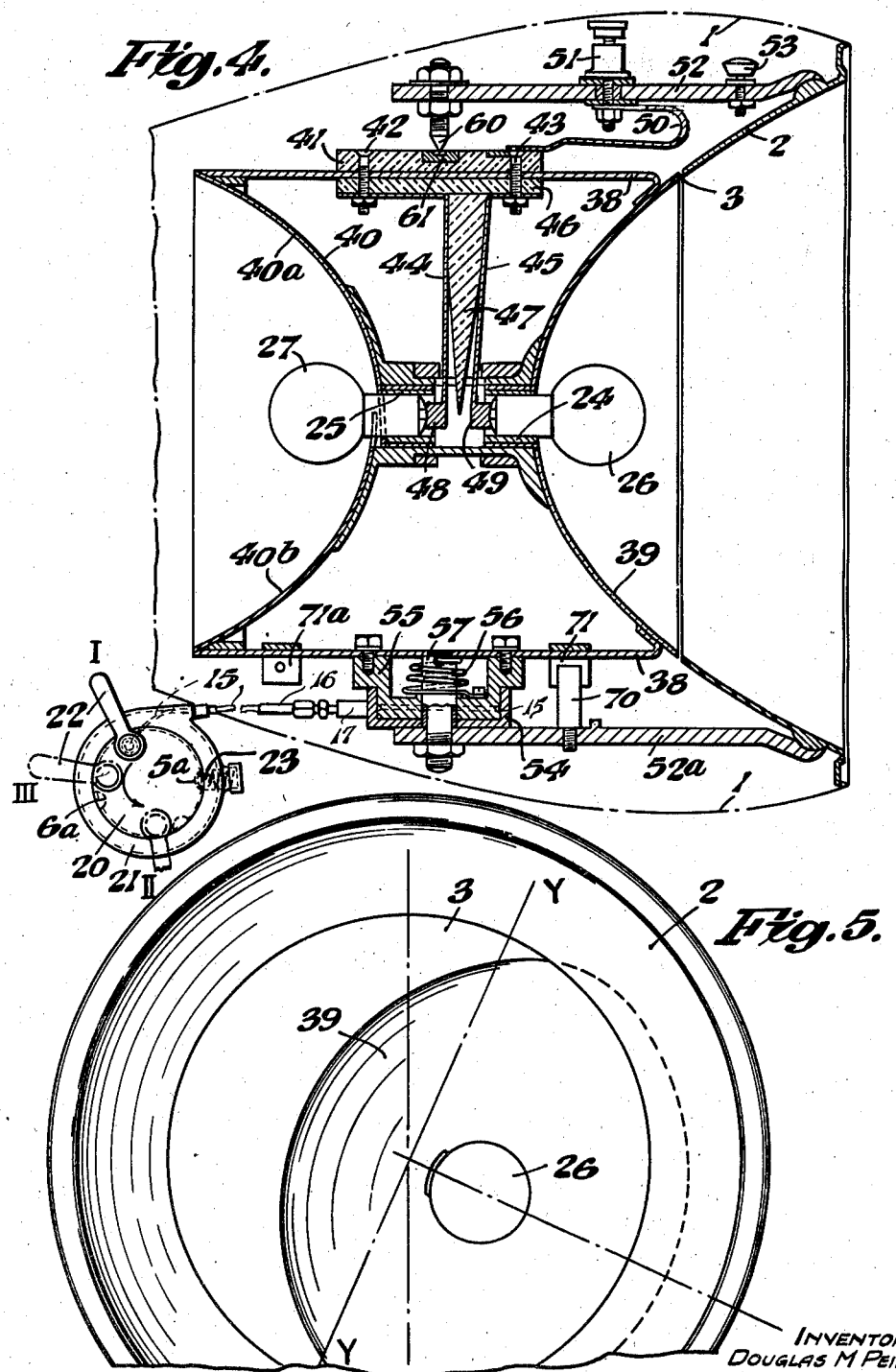

July 12, 1938.                D. M. PEILL ET AL                2,123,435
                           LAMP FOR ROAD VEHICLES
                             Filed Feb. 6, 1937              4 Sheets-Sheet 3
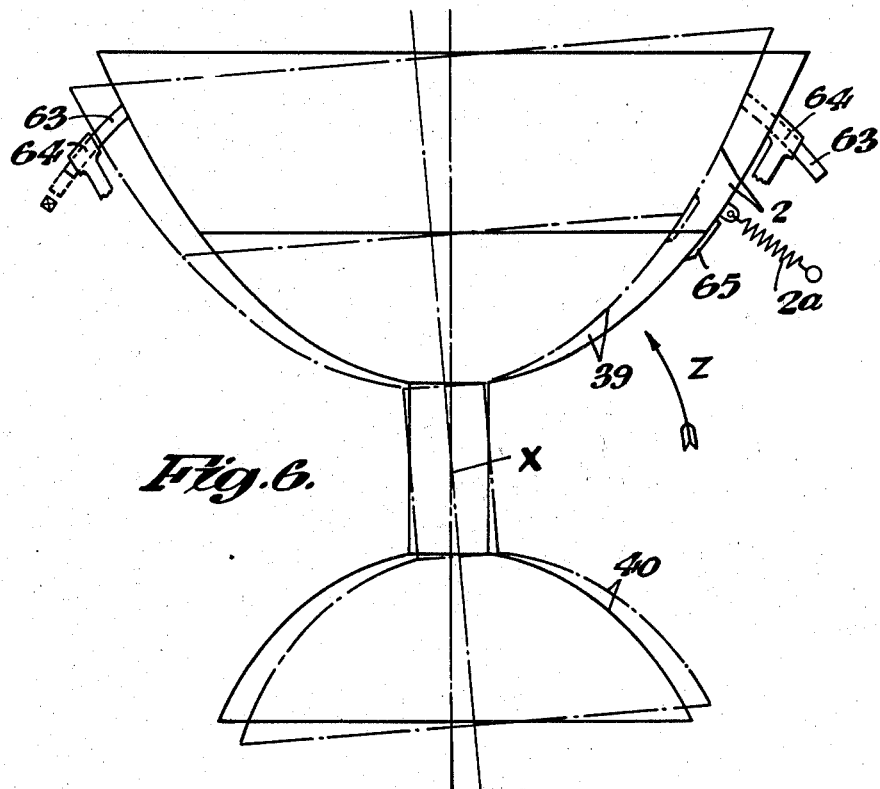
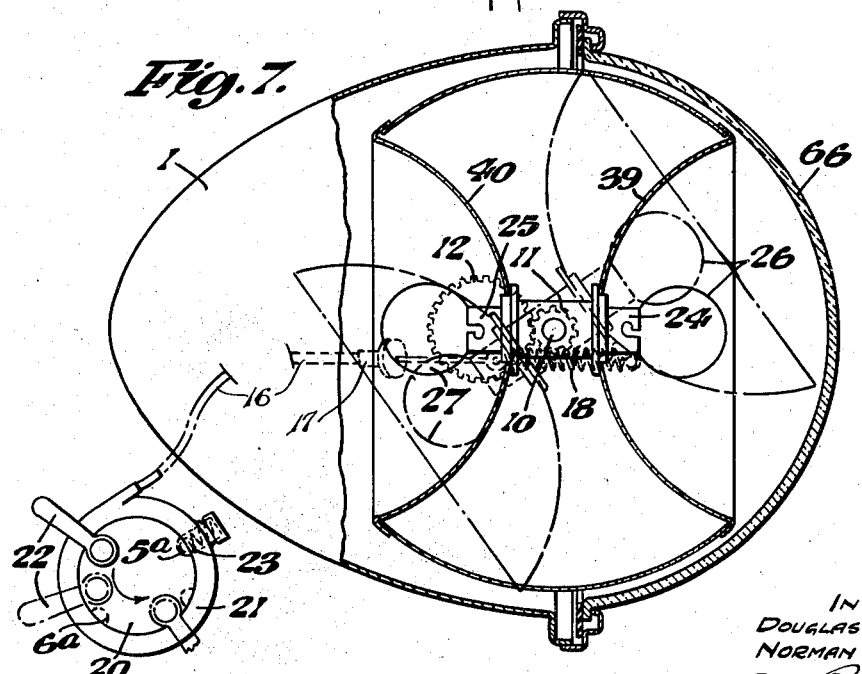
INVENTORS
DOUGLAS M PEILL
NORMAN MACINTYRE
PER Rayner
ATTORNEYS July 12, 1938.   D. M. PEILL ET AL   2,123,435
LAMP FOR ROAD VEHICLES
Filed Feb. 6, 1937   4 Sheets-Sheet 4
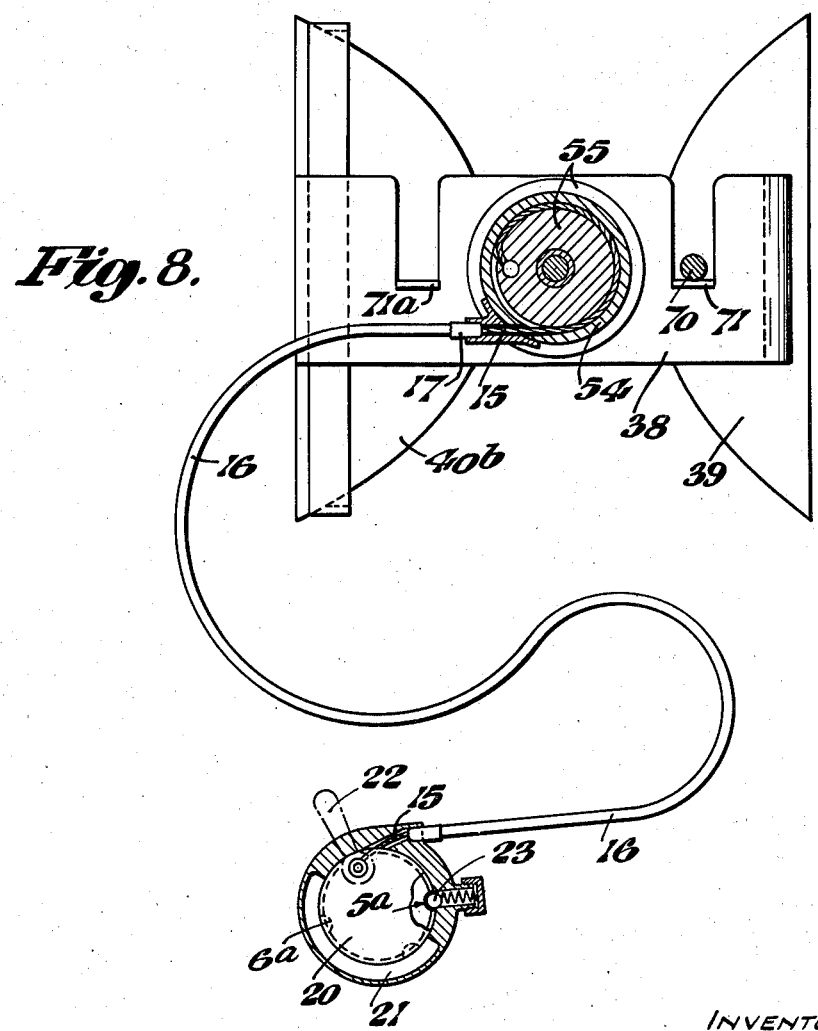
INVENTORS
DOUGLAS. M. PEILL
NORMAN MACINTYRE
PER Rayner &
ATTORNEYS Patented July 12, 1938

2,123,435

UNITED STATES PATENT OFFICE 2,123,435

LAMP FOR ROAD VEHICLES

Douglas Muir Peill and Norman Macintyre, Glasgow, Scotland

Application February 6, 1937, Serial No. 124,405
In Great Britain February 13, 1936

7 Claims. (Cl. 240—37)

This invention relates to headlamps for road vehicles and more particularly to headlamps provided with means for changing the nature of the projected beam, e. g. from the normal maximum range ahead beam to a diffused or deflected and/or coloured beam. The object of this invention is to provide a headlamp in which the change in the nature of the projected beam is of a distinctive nature and effected by a positive operation not necessitating complicated or expensive parts. Another object of this invention is to enable a change from normal maximum range beam to a dipped or deflected beam and a further change to a coloured or diffused beam, e. g. suitable for use in fogs.

According to this invention a number of reflectors are provided together with means for selectively moving them to the operative position.

In carrying an embodiment of the invention into practice a headlamp comprising a casing accommodating a pair of oppositely directed reflectors arranged one in rear of the other and mounted on a common pivotal support interposed between them, each of said reflectors accommodating its own lamp, means for automatically connecting the lamps to the source of current when they are brought to the operative position, and means controllable from a remote controlling device for rotating the two reflectors as a single unit about the axis of said pivotal support so as to reverse the positions of the two reflectors, the two reflectors having distinctive light projecting characteristics, e. g. one projecting a normal maximum range beam and the other a diffused and/or coloured beam. In such an arrangement the outer casing can have a normal fixed parobolic reflector which however is truncated by having an inner portion removed, such removed portion being substituted by one of the beforementioned reflectors which occupies the front position, i. e. each of the said pair of reflectors being adapted to complete continuity of the fixed reflector part of the casing. The change in character of beam can be effected by adopting different positions of the electric lamp filaments in relation to their respective reflectors and/or by adopting a yellow or other suitable colour with one of the reflectors the other being white. Suitable detent or other retaining means can be provided with the remote control device for selecting the positions of the reflectors and also an additional position can be provided for in which one of the reflectors occupies a laterally or part laterally and part downwardly inclined operative position for projecting a dipped beam. This latter effect can be achieved by inclining the axis about which the pair of reflectors rotate.

In order that this invention can be clearly understood and readily carried into effect three sheets of drawings are appended hereto illustrating embodiments thereof, and wherein:—

Fig. 1 is a sectional side elevation of one embodiment.

Fig. 2 is a sectional front elevation on the line 2a—2a of Fig. 1.

Fig. 3 is an inverted sectional plan view taken on the line 3a—3a of Fig. 1 and showing the means for rotating the coupled pair of reflectors.

Fig. 4 is a sectional side elevation on the line Y—Y of Fig. 5 which is a front elevation of a headlamp showing a method of obtaining a dipped beam and showing the appropriate reflector element dipped.

Fig. 6 is a diagrammatic view in plan showing an alternative means for obtaining a dipped and/or deflected beam.

Fig. 7 is a sectional plan view showing a modification in which the rotatable reflectors each constitutes a complete reflector, and Fig. 8 is a detail part sectional inverted plan view showing the connection between the hand control device and the headlamp.

Referring to the drawings in Figs. 1, 2, and 3 the outer casing 1 may be of conventional configuration and it has fitted therein the customary reflector 2 which however is fore-shortened or truncated at its inner end to provide a circular opening 3 which is normally closed by a shallow cylindrical lamp carrier 4 with its axis arranged on the same axis as the reflector 2, and provided with opposed reflectors which in this embodiment comprise a pair of concave or cupped surfaces 5 and 6 so shaped that each of them is adapted to complete the continuity of the fixed reflector 2. These reflectors 5 and 6 are brought selectively into operative position by rotating the lamp carrier 4 through a semi-circle about a vertical, or other desired axis for which purpose the lamp carrier 4 is mounted between a pair of fixed bracket plates 7 and 8 which can bridge the rear part of the outer casing 1 and the inner truncated edge of the reflector 2. An upper pivot pin 9 is carried by the upper part of the periphery of the carrier 4 and is engaged in an aperture in the upper bracket plate 7, whilst a lower pivot pin 10 carried by the lowest part of the periphery of the carrier 4 passes through the lower bracket plate 8 and carries a pinion 11. This pinion 11 is engaged by a gear wheel 12 supported for rotation by the lower bracket plate 8 and formed near its periphery with a depending pin 13 over which is engaged a collar 14 carried by one end of a Bowden cable 15, the sheath 16 of which is secured to the rear face of the casing 1 as at 17. A coiled tension spring 18 is connected under tension to the depending pin 13 of the gear wheel 12 and to a fixed pin 19 fixed to the bracket plate 8. This tension spring yieldingly opposes the pull of the Bowden wire 15 and allows the gear wheels 12 and pinion 11 to be rotated by such pull resulting in the carrier 4 being swung through a semi-circle so as to change the face of the carrier 4 presented to the fixed reflector 2. The cable 15 can be actuated by any suitable form of control device, e. g. by means of a disc 20 rotatable in a fixed cylindrical housing 21 mounted on the dashboard or other convenient part of the vehicle. The cable is connected to the disc 20 which carries an operating finger piece 22, and the disc 20 can be located in the two positions appropriate to the change of reflectors 5 and 6 by means of a spring detent member 23 which engages in recesses 5a and 6a in the periphery of the disc 20.

The reflectors 5 and 6 comprising the opposed faces of the carrier 4 have secured thereto lamp sockets 24 and 25 respectively, in which are fitted lamps 26 and 27 respectively. The lamp 26 can occupy the normal focal position to produce the normal maximum range beam, and the lamp 27 a position which produces a dimmed or diffused beam of light. Alternatively or additionally, the reflector 6 can have a different contour than the normal reflector 5. Also the reflector 6 can be coloured, e. g. amber and/or its lamp can be coloured. The carrier 4 can be a solid glass or other suitable moulding and silvered on its reflector parts 5 and 6.

Electrical conductors 24a and 24b pass through opposite sides of the carrier 4 to the socket 24, and a further pair of conductors 25a and 25b pass through the carrier to the socket 25. The two leads of the lighting circuit are connected to a pair of spring plunger members 28 and 29 on the upper bracket plate 7 from which they are insulated, and the plunger elements thereof engage recessed contacts 30 and 31 in the top of the carrier 4, these contacts receiving the leads 24a and 25a of the sockets 24 and 25, the other two leads being connected to recessed contacts 30a and 31a in the lower side of the carrier which are engaged by spring plunger members 28a and 29a. The spring plungers 28 and 28a are not included in the electrical circuit but the others receive the leads 32 and 33 of the flex leading to the source of current. By using two pairs of spring plungers the carrier 4 is firmly held in its operative positions, and as the recessed contacts in the carrier 4 are symmetrical with respect to the pivotal axis of the carrier 4 the lamps 26 and 27 are automatically brought into circuit when brought to the operative positions.

Referring to Figs. 4 and 5 the casing 1 has a truncated reflector part 2. The bulbs 26 and 27 are arranged as hereinbefore described at different distances from their appropriate reflectors. The rotatable carrier in this case comprises upper and lower arms 38 connected at their ends to reflector parts 39, 40, either one of which, when in position, makes up the complete reflector of the lamp together with the stationary part 2. The upper arm 38 carries a disc 41 of insulating material in which are provided two contacts 42, 43, the latter of which is of extended arcuate form for a purpose to be described later. These contacts are connected to L-shaped spring contact arms 44, 45 attached to a bar 46 of insulating material and separated by a pointed downward projection 47 of similar material. The arms 44, 45 are provided with end contacts 48, 49 which are pressed into electrical contact with the terminals of the bulbs 26, 27. The contacts 42, 43 are adapted to be engaged, depending upon their position, by a spring arm 50 attached to a supply terminal 51 mounted in suitable insulation in an arm 52 attached to the reflector part 2. This arm also carries the earth terminal 53. The carrier is rotatably supported at its lower end by means of an annularly stepped bearing member 55 attached to the lower arm 38 and fitting into a cup-shaped bearing 54 supported on a lower arm 52a. One end of a coil spring 56 is attached to the bearing member 55 while the other end is attached to a fixed spindle 57 mounted on the arm 52a. The Bowden control wire 15 is attached at one end to the bearing member 55 while the other end is connected to the disc 20 of the control device located on the dashboard or other place convenient to the operator. At the upper end the carrier is rotatably supported by means of a pointed pivot pin 60 engaging a bearing disc 61 in the insulation disc 41. The pointed pivot pin 60 and the spindle 47 lie in alignment on the line Y—Y shown in Fig. 5, i. e. at an inclination (for example, about 30°) to the vertical with the result that the carrier rotates in an inclined plane.

In Fig. 4 the normal bulb 26 is in operative position, this corresponding to the position I of the operating lever 22 of the Bowden control in the position marked I. When the lever is moved to the position marked II the carrier is rotated through 180° against the action of spring 56 to bring the lamp 27 into position, and when the lever is in the position marked III (that is, somewhat more than 50° from position I) the ordinary lamp 26 and reflector 39 are dipped into the position shown in Fig. 5, in which case the beam is directed downwardly and to the near side due to the fact that the axis about which the carrier rotates is inclined laterally with respect to the normal forward direction of the emitted beam.

A stop 70 on the arm 52a serves, in conjunction with the abutments 71, 71a on the lower arm 38, to position the carrier with the bulb 26 or 27 correctly in their appropriate positions.

It will be noted that the reflector 40 consists of an upper and lower half 40a and 40b which are in stepped relationship in order to give a low flat beam which is particularly suitable for use as a fog light, "pass" light (for lighting the road ahead but without dazzling traffic passing in the opposite direction) or the like.

It will be understood that the arcuate contact 43 still maintains contact with the arm 50 in position III and thus the bulb 26 is kept illuminated in any between positions I and III. On the other hand, immediately the lamp 27 is moved slightly from its operative position it is switched off owing to the small area of the contact 42.

In the diagrammatic arrangement in Fig. 6, the fixed reflector part is indicated by the reference numeral 2, the normal light reflector part by 39 and the fog or other modified light reflector part by 40 and the axis of rotation is denoted by X. The fixed reflector 2 is provided at each side with arcuate arms 63 of square or other non-circular cross section the curvature of which lies about the centre of rotation X. These arms 63 slidably engage stationary brackets 64 and the reflector part 39 is provided with a projection 65 adapted to overlap the reflector 2. The position shown in full lines shows the ordinary reflector 39 in normal position while the dotted lines indicate the case where the beam from this reflector is dipped or deviated, this being obtained by appropriately moving the carrier with the reflector parts 39, 40, as indicated by the arrow Z, so that the projection 65 causes the reflector 2 to rotate about the axis X, being guided by the arms and brackets 63, 64. In this embodiment rotation by 180° in the direction of the arrow is first of all necessary to change from the fog or other modified light to the normal light and a small extra rotation is necessary to dip the beam. A spring 2a is provided for normally retaining the reflector part 2 in its normal position and for returning it to that position. It will be understood that the axis of rotation X may be vertical, or may be inclined as in Fig. 5.

In Figs. 4, 5, and 6, as in Figs. 1 to 3, the bulb and/or reflector part for the modified beam may be amber coloured for use in fog, or may be otherwise coloured or plain and the bulb may be located at the focal point. It will also be understood that a stepped reflector may be used with the two-position carrier, the stepped reflector giving a low flat beam suitable as a "pass" or anti-dazzle light and obviating the need for deviation of the beam by moving the carrier to a third position.

If desired the two reflectors 39 and 40 may each comprise a complete reflector without relying upon the additional fixed part 2. Such an arrangement is shown in Fig. 7 in which the front glass 66 of the lamp is of substantially half spherical form whereby the reflectors may each occupy a position close to the front glass. Such an arrangement has the advantage that when the appropriate reflector is adjusted to effect a dipped and/or inclined beam as indicated in broken lines in Fig. 7 the full radius or span of the beam is still maintained owing to the curvilinear section of the front glass avoiding cutting off any of the beam by the casing 1.

The two head lamps of a motor vehicle, (i. e. one at each side of the vehicle) may be operated by individual Bowden cables, but preferably the two lamps are operatively connected by a wire or rod, or the like which could be housed in or alongside the usual bracing strut which interconnects the two head lamps of a motor vehicle.

We claim:—

1. In a headlamp a reflector therein foreshortened or truncated at its inner end to provide an opening therein, a pair of supplementary reflectors arranged behind the first mentioned reflector and shaped so as to individually complete the continuity of the first mentioned reflector, said supplementary reflectors being adapted to project beams of different character, remote control means for bringing said supplementary reflectors into and out of the operative position in continuity with the said first mentioned reflector, co-operating abutments on one of said supplementary reflectors and the first mentioned reflector, said first mentioned reflector being tiltably mounted and adapted to be moved from the normal position to the tilted position by engagement of said abutments combined with movement of one of said reflectors to an inclined beam projecting position by said remote control means.

2. In a headlamp, a casing, a pair of back to back reflectors in said casing mounted to rotate about a common inclined axis in the casing to bring them selectively into operative beam projecting positions, and remote control means having three locating positions for setting one of said reflectors in two alternative beam projecting positions and for setting the operative position of the other reflector, the said reflectors having distinctive beam projecting characteristics, separate lamp sockets in said reflectors, terminals in said sockets, a pair of spring contacts in the casing between the reflectors and engaging the terminals of the lamp sockets, an insulated spacing member separating said contacts, a further insulated member carrying said pair of contacts, a spring contact pressed against said further insulated member and adapted to alternately establish electrical connection with the said pair of contacts when the said reflectors are rotated to reverse their position.

3. In a headlamp for vehicles, a casing, a pair of reflectors arranged back to back in the casing, a common rotary carrier for said reflectors, separate electric lamp sockets in said reflectors, conductors to the terminals of said sockets, contacts receiving said conductors carried by the carrier, and a number of spring plunger contacts in the casing adapted to engage the beforementioned contacts and also serving as a means for steadying the carrier within the casing when one of the reflectors is in the beam projecting position.

4. A vehicle headlamp comprising a casing, a substantially paraboloidal main reflector in said casing, a central opening in said reflector, a carrier rotatable in said casing, a pair of angularly spaced supplementary reflectors with distinctive beam producing characters, carried by said carrier and each being shaped and adapted to close said opening and complete the curvilinear continuity of the said main reflector, contacts on said carrier, separate lamp sockets in the said supplementary reflectors to which said contacts are separately connected, a fixed support wholly accommodated within the casing for said carrier, contacts on said fixed support, mechanism within the casing and remote control means connected thereto to partially rotate said carrier alternately in reverse directions to alternately engage the fixed contacts with the sets of contacts appropriate to the said two lamps, and means on the said support and said carrier to automatically secure the carrier against freedom of movement when either of the supplementary reflectors is located in said opening in the main reflector.

5. In a vehicle headlamp, a casing, a substantially paraboloidal main reflector in the casing, a central opening in said reflector, a pair of brackets located on opposite sides of the said opening between the rears of the casing and said reflector, a rotatable carrier disposed between and supported by said brackets, a pair of concave reflectors carried by said carrier, said concave reflectors adapted to co-operate with separate light sources to project distinctive beams, said reflectors being angularly spaced about the axis of rotation and adapted when in operating position to substantially fill said opening, separate lamp sockets in said concave reflectors, contacts on said carrier separately connected to said sockets, contacts on said brackets one of which is adapted to be connected to a source of current, step up gearing carried by one of said brackets adapted to rotate said carrier to change the concave reflector located in the said opening in the main reflector, spring means yieldingly opposing rotation of the carrier in one direction, remote control means to operate said gearing, and co-operating interengaging locating elements on one of said brackets and said carrier to locate and secure the carrier in its alternative positions.

6. A vehicle headlamp comprising a casing, a substantially paraboloidal main reflector in said casing, a central opening in said reflector, a carrier arranged in the casing immediately behind said opening and mounted to rotate about an inclined axis and carrying two units each comprising a light source and associated supplementary reflector adapted to cover said opening to complete the curvilinear continuity of the main reflector, said units being arranged diametrally back-to-back thereon, said carrier being turnably adjustable about said axis into three positions, the second at about 180° to the first, and the third somewhat more than 180° to the first, or somewhat more than 0° to the first, in order to give a dipped beam.

7. A vehicle headlamp comprising a casing, a substantially paraboloidal main reflector in said casing, a central opening in said reflector, a carrier rotatable in said casing, a pair of angularly spaced supplementary reflectors with distinctive beam producing characters, carried by said carrier and each being shaped and adapted to close said opening and complete the curvilinear continuity of the said main reflector, contacts on said carrier, separate lamp sockets in the said supplementary reflectors to which said contacts are separately connected, a fixed support wholly accommodated within the casing for said carrier, spring plungers carried by said support, two sets of contacts on said carrier connected to said sockets, said plungers serving as terminal contacts and being adapted to be engaged by said contacts and to be connected to a source of current and also serving as means for positioning the carrier in correct position at completion of each turning movement of the carrier, and remote control means to effect said turning.

DOUGLAS MUIR PEILL.
NORMAN MACINTYRE.